(12) United States Patent
Das et al.

(10) Patent No.: US 8,104,029 B2
(45) Date of Patent: Jan. 24, 2012

(54) METHOD FOR COMPUTATION-COMMUNICATION OVERLAP IN MPI APPLICATIONS

(75) Inventors: Dibyendu Das, Bangalore (IN); Manish Gupta, Yorktown Heights, NY (US); Rajan Ravindran, Bangalore (IN); Bhaskaran Venkatsubramaniam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/103,705

(22) Filed: Apr. 15, 2008

(65) Prior Publication Data

US 2009/0260018 A1 Oct. 15, 2009

(51) Int. Cl.
- *G06F 9/45* (2006.01)
- *G06F 15/16* (2006.01)
- *G06F 3/00* (2006.01)
- *G06F 9/44* (2006.01)
- *G06F 9/46* (2006.01)
- *G06F 13/00* (2006.01)

(52) U.S. Cl. .......... 717/151; 709/205; 719/313
(58) Field of Classification Search .......... 717/151; 719/313; 709/205
See application file for complete search history.

(56) References Cited

U.S. PATENT DOCUMENTS

| 4,949,255 | A | 8/1990 | Gerth et al. |
| 5,748,959 | A | 5/1998 | Reynolds |
| 5,758,161 | A | 5/1998 | Reynolds |
| 5,862,340 | A | 1/1999 | Reynolds |
| 6,338,147 | B1 | 1/2002 | Meth et al. |
| 6,477,584 | B1 | 11/2002 | Hickerson |
| 6,751,791 | B2 | 6/2004 | Inaba |
| 6,799,317 | B1 | 9/2004 | Heywood et al. |
| 2001/0052119 | A1* | 12/2001 | Inaba ............... 717/9 |
| 2002/0165838 | A1* | 11/2002 | Vetter ............... 706/20 |

OTHER PUBLICATIONS

Ganesh Gopalakrishnan et al., "Formal analysis for debugging and performance optimization of MPI", Mar. 2007, Parallel and Distributed Processing Symposium, 2007. IPDPS 2007. IEEE International, pp. 1-6.*

Lewis Fishgold et al., "An Automated Approach to Improve Communication-Computation Overlap in Clusters", Apr. 2006, Parallel and Distributed Processing Symposium, 2006. IPDPS 2006. 20th International.*

Wei-Yu Chen et al., "Communication Optimizations for Fine-grained UPC Applications", Sep. 2005, Parallel Architectures and Compilation Techniques, 2005. PACT 2005. 14th International Conference, pp. 267-278.*

Walker, The Design of a Standard Message Passing Inter-face . . . , Oak Ridge National Laboratory, Oct. 1993.

Kawaguchi, Static Allocation of a Parallel Program Modules . . . , Dept. of Electronics Engin., Miyazaki Univ. Miyazaki, Japan, 1992.

Sur, et al, RDMA read based Rendezvous Protocol for MPI over InfiniBand . . . , Abstract, Association for Computing Machinery, Mar. 29-31, 2006.

* cited by examiner

*Primary Examiner* — Ted T Vo
*Assistant Examiner* — Lanny Ung
(74) *Attorney, Agent, or Firm* — Robert K. Carpenter; Robert C. Rolnik; David A. Mims

(57) ABSTRACT

A computer implemented method is provided for optimizing at the time of compiling a program that employs a message-passing interface (MPI). The method includes: detecting an MPI application source file; identifying a non-blocking communication within the MPI application source file; and overlapping independent computation concurrently with the non-blocking communication. A system is also provided.

2 Claims, 13 Drawing Sheets

```
subroutine copy_faces

// calculate out_buffer mpi_irecv(in_buffer(sr(0),...,requests(0),...)
mpi_irecv(in_buffer(sr(1),...,requests(1),...)
...
mpi_irecv(in_buffer(sr(5),...,requests(5),...)

mpi_isend(out_buffer(ss(0),...,requests(6),...)
mpi_isend(out_buffer(ss(1),...,requests(7),...)
...
mpi_isend(out_buffer(ss(5),...,requests(11),...)

mpi_waitall(12,requests,...) // wait for all the
                             //  irecv/isends //Code that uses in_buffer ...
// NOTE: No use of out_buffer here
end subroutine
```

FIG. 2A

```
subroutine adi
call copy_faces call txinvr call x_solve   // uses out_buffer
               // set in copy_faces
call y_solve   // uses out_buffer
call z_solve   // uses out_buffer call add
return
end subroutine
```

FIG. 2B

```
subroutine copy_faces

// calculate out_buffer mpi_irecv(in_buffer(sr(0),...,requests(0),...)
mpi_irecv(in_buffer(sr(1),...,requests(1),...)
...
mpi_isend(out_buffer(ss(0),...,requests(6),...)
mpi_isend(out_buffer(ss(1),...,requests(7),...)
...
mpi_waitall(6,requests,...) // wait for isends can be sunk
                            // after txinvr call
mpi_waitall(6,requests+6,...) // these are for irecvs
```

FIG. 3

```
do stage = 1, ncells
  c = slice(1,stage)
  isize = ... jsize =   ksize = if ( stage .eq. ncells ) then last = 1 else last = 0 endif
  if ( stage .eq. 1 ) then
    first = 1
    call lhsx( c )                              // lhs = ...
    call x_solve_cell ( first, last, c )        // lhs = ..., rhs = ...
  else
    first = 0
    // calls mpi_irecv ( out_buffer,...)
    call x_receive_solve_info(recv_id,c)
    call lhsx( c )                              // lhs = ...

call mpi_wait ( send_id, ... )              // wait for the prev iterations' mpi_isend
    call mpi_wait ( recv_id, ... )              // wait for the mpi_irecv call x_unpack_solve_info ( c )              // lhs = out_buffer, rhs = out_buffer
    call x_solve_cell ( first, last, c )        // lhs = ..., rhs = ...
  endif if ( last .eq. 0 )
    call x_send_solve_info( send_id, c ) // in_buffer = ..., mpi_isend(in_buffer,...)

end do
```

FIG. 11

```
ConservativeMpiWaitSinking(func f)
{
    CaptureIsendIrecvWait(f) // captures all Isend/Irecv/wait/waitall and annotates f with relevant set of tuples - TS
    Compute Dominator Tree, DT, of f
    WaitGraph = Φ
    // mpi_wait matching phase in function f – creates the original WaitGraph
    for ( every pair <T1,T2> in TS)  do { // where T1 = <mpi_isend/irecv,buf,stat1> and T2= <mpi_wait/waitall,stat2>
        if ( T1 dominates T2 && stat1 == stat2 )
            Create Nodes for T1 and T2 and add a dependence edge (of distance = 0) between T1-T2
        else if ( T1 does not dominate T2 && stat1 == stat2 )
            Check whether T1 and T2 are in a loop and add a dependence edge (of distance >=1) between T1-T2
        Add T1,T2 and dep edge to WaitGraph // Note if T1 or T2 is already present in WaitGraph we need not insert a new node
    }
    // mpi_wait dependence web building
    for ( every mpi_wait/waitall node W in WaitGraph ) do {
        buf = GetMatchedCall(W).GetBuffer()
        for ( every use/def of buf in f ) do {
            if ( GetMatchedCall(W) == mpi_isend and def of buf) {
                Create a node T for the def instruction and add it to the WaitGraph
                Add a WAR dependence edge between T and W
            }
            else if  ( GetMatchedCall(W) == mpi_irecv and use of buf) {
                Create a node T for the use instruction and add it to the WaitGraph
                Add a RAW dependence edge between T and W
            }
        }
    }
    ConservativeWaitSinkGenerate(WaitGraph, IntervalTree(f)) // sink waits only within an interval
}
```

```
ConservativeWaitSinkGenerate(WaitGraph WG, IntervalTree ITree) // Sink mpi_waits on an intra-interval basis
{
    while ( more mpi_waits/waitall are to be processed in WG ) do {
        W = mpi_waita/waitall node in the WaitGraph
        Let L be the interval in which the mpi_wait/waitall node appears
        if ( OutDegree(W) == 0 ) // no dependence in the current function
            SinkCodeGenerate(ExitBlock(L), f, W) // generates code at the ExitBlock(L) which is the last block of the interval L
        else {
            DBSet = Set of nodes that are children of W in WaitGraph whose dependence distance is 0
            if ( DBSet is empty ) SinkCodeGenerate(ExitBlock(L), f, W) // insert waits at the end of the loop
            sinkBlock = lca(DBSet) in the Dominator Tree, DT – gives the least common ancestor
            while ( ! done ) {
                if ( sinkBlock postdominates GetDomNode(W) ) {
                    SinkCodeGenerate(sinkBlock, f, W )
                    done = true;
                }
                else
                    sinkBlock = Immediate Dominator of sinkBlock
            }
        }
        Mark W as completed
    }
}
```

FIG. 6

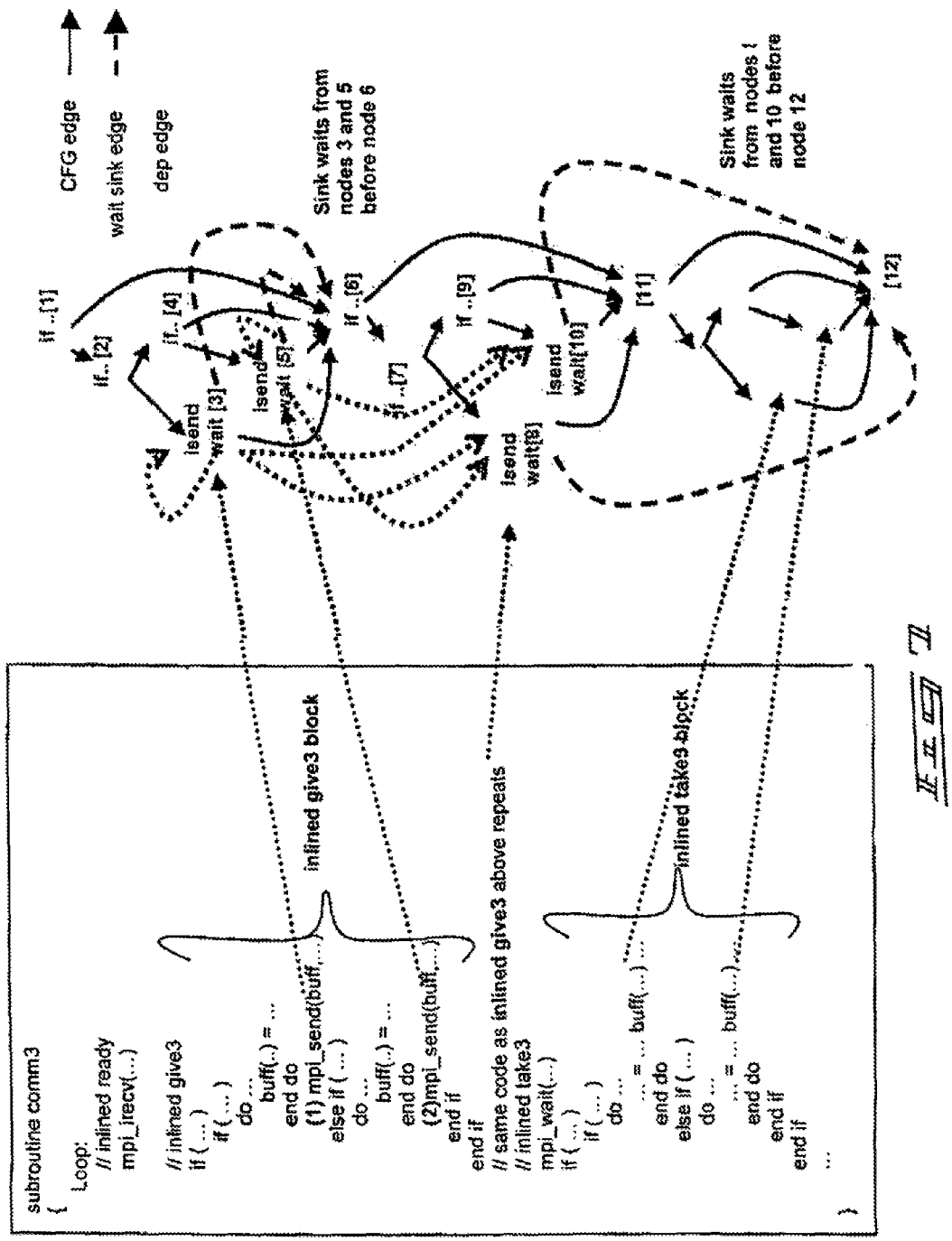

```
subroutine comm3
{
    b_<1> = b_<2> = b_<3> = b_<4> = FALSE;
    Loop:
    // inlined ready
    mpi_irecv(...)

// inlined give3
    if (...)
        if (...)
            ...
            buff(..) = ...
            (1) mpi_isend(buff,...) ; b_<1> = TRUE;
        else if (...)
            ...
            buff(..) = ...
            (2)mpi_isend(buff,...); b_<2> = TRUE;
        end if
    // inlined give3
    if (...)
        if (...)
            ...
            buff(..) = ...
            (3) mpi_isend(buff,...) ; b_<3> = TRUE;
        else if (...)
            ...
            buff(..) = ...
            (4)mpi_isend(buff,...); b_<4> = TRUE;
        end if
    // inlined calls to take3
    // mpi_wait has been moved across the inlined calls to
    // take3 as there are only uses of buff but no definitions
    if ( b_<1> ) mpi_wait(...); b_<1> = FALSE
    if ( b_<2> ) mpi_wait(...); b_<2> = FALSE
    if ( b_<3> ) mpi_wait(...); b_<3> = FALSE
    if ( b_<4> ) mpi_wait(...); b_<4> = FALSE
}
```

FIG. 8

```
AggressiveWaitSinkGenerate(WaitGraph WG, IntervalTree ITree)
// Sink mpi_waits as late as possible aggressively
{
    while ( more mpi_wait/waitall to be processed in WG ) do {
        Let W = mpi_wait/waitall node in the WaitGraph WG
        Let L = interval where W appears and LoopCount(L) be the iteration size of L
        if ( there exist some dependences of W outside L ) {
            Let LDSet = { set of all intervals where dependence exists }
            Find LSink = lca(LDSet,L) in ITree // Find least common ancestor of the dependent set as well as
                                               //    the interval where wait appears Lpred = pred(L) // predecessor of L in the ITree
            Lcount = LoopCount(L)
            while ( Lpred != LSink ) Lpred = pred(Lpred) ; Lcount = Lcount * LoopCount(Lpred);
            Let SinkNode = Exit Node of Lpred
            AggressiveSinkCodeGenerate(SinkNode, WG, W, Lcount)
        }
        else {
            // if no dependences exist outside L generate the final compensation code at the end of the function
            AggressiveSinkCodeGenerate(EndNode(RootNode(ITree)), WG, W, Lcount);
        }
    }
}
```

FIG. 9

```
subroutine comm3
{
    integer w_cnt_<1> = w_cnt_<2> = i_cnt_<1> = i_cnt_<2> = 0; loop_cnt = 3;
    integer Rid_<1>[loop_cnt], Rid_<2>[loop_cnt];
    Loop:
        // inlined ready
        mpi_irecv(...)

// inlined give3
        if (....)
            if (....)
                if ((i_cnt_<1> - w_cnt_<1> gt. 0)
                    mpi_wait(...,Rid_<1>[w_cnt_<1>]); w_cnt_<1>++;
                If ((i_cnt_<2> - w_cnt_<2>.gt. 0)
                    mpi_wait(..., Rid_<2>[w_cnt_<2>]); w_cnt_<2>++;
                ...
                buff(..) = ...
                (2) mpi_isend(buff,...,Rid_<1>[i_cnt_<1>]...) ; i_cnt_<1>++;
                else if ( ... )
                buff(..) = ...
                (2) mpi_isend(buff,...,Rid_<2>[i_cnt_<2>]...) ; i_cnt_<2>++;
                end if
            end if
    // End of Loop
    // Groups of waits for isends that did not get consumed in the Loop above.
    do ii = w_cnt_<1>, i_cnt_<1>-1
        mpi_wait(...,Rid_<1>[ii]);
    do ii = w_cnt_<2>, i_cnt_<2>-1
        mpi_wait(...,Rid_<2>[ii]);

// assume some code dependent on buf is here
}
```

Aggressive wait sinking

Insert this set of statements before all the def points of buff inside the loop

FIG. 11

```
AggressiveSinkCodeGeneration(Node SinkNode, Node WaitNode, WaitGraph WG, int LoopCount)
{
    L = Interval in which Waitnode is present
    Create three variables : w_cnt_<num>, i_cnt_<num>, Rid_<num>[LoopCount]
    Let M = matched mpi_isend/irecv node
    Insert (after M) the code to post-increment i_cnt_<num>
    Replace the request id of mpi_isend/irecv by R_id_<num>[i_cnt_<num>]
    for ( every dependence point in L ) do {
        Insert an if-conditional to check whether w_cnt_<num> exceeds i_cnt_<num>
        In the true part insert the code to invoke "mpi_wait(...,Rid_<num>[w_cnt_<num>])
        In the true part insert the code to post-increment w_cnt_<num>
    }
    // SinkNode is the node where code should be generated for inter-interval sinking
    At SinkNode do the following:
    {
        Insert code to create a loop that runs from w_cnt_<num> to i_cnt_<num>
        Insert code in the loop body to invoke mpi_wait(...,R_id_<num>[index of loop])
    }
    num++;
}
```

FIG. 12

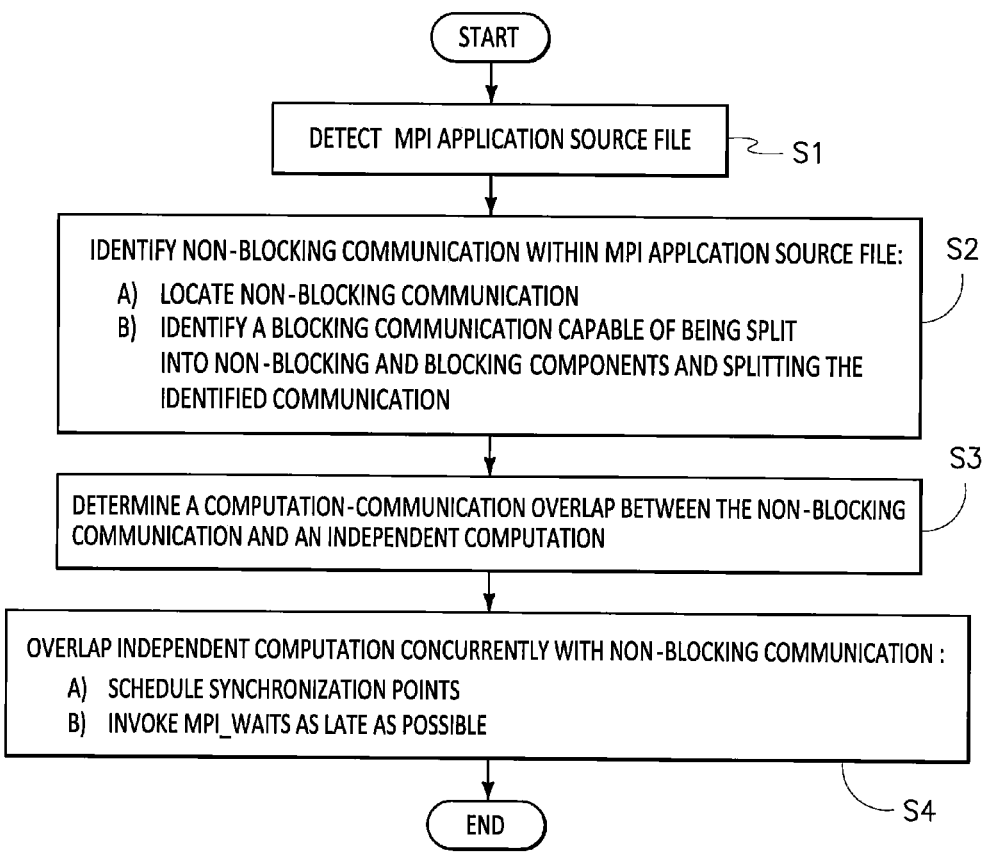

METHOD FOR COMPUTATION-COMMUNICATION OVERLAP IN MPI APPLICATIONS

TECHNICAL FIELD

This invention pertains to optimization systems and methods for a compiler that uses a message-passing interface (MPI). More particularly, the present invention relates to an optimization system and method that realizes reduced run time when executing MPI programs.

BACKGROUND OF THE INVENTION

It is known to initiate code optimization techniques with modern compilers. One technique entails hand optimization. However, hand-optimization can introduce unusual constructs that can obscure the intentions of an application from the compiler and limit optimization opportunities.

According to one known code optimization technique, for better computation-communication overlap, a message-passing interface (MPI) provides non-blocking versions of MPI_send and MPI_recv (and its other variants), called MPI_isend and MPI_irecv (and its other variants). The intention is that the programmer will intelligently, but manually, invoke computation in between an MPI_isend/MPI_irecv and its matching mpi_wait. However, this job is easier said than done. While programmers may attempt to exploit this overlap, it may not be possible to do this in many circumstances because doing this manually is non-trivial. Accordingly, implementation of this manual technique can result in missed chances or opportunities, thereby resulting in poor computation-communication overlap (CCO) and higher run time for the programs executed.

According to another known technique, previous work in the area of CCO also termed as split-phase communication, has targeted various languages like UPC. However, split-phase communication has not been applied to explicit message passing applications like MPI. One technique deals with HPF. However, the main purpose of the work is message coalescing rather than CCO. In addition, the UPC work uses a very simplistic algorithm to expose CCO for UPC code which is inadequate for non-trivial applications. None of the algorithms in the referenced papers is able to carry this out.

SUMMARY OF THE INVENTION

According to one aspect, a computer implemented method is provided for optimizing at the time of compiling a program that employs a message-passing interface (MPI). The method includes: detecting an MPI application source file; identifying a non-blocking communication within the MPI application source file; and overlapping independent computation concurrently with the non-blocking communication.

According to another aspect, a method is provided for optimizing a program that employs a message-passing interface (MPI). The method includes: providing an MPI application source file; identifying a non-blocking communication within the MPI application source file; determining a computation-communication overlap between the non-blocking communication and an independent computation; and overlapping the independent computation concurrently with the non-blocking communication.

According to yet another aspect, a computer system is provided for optimizing at the time of compiling a program that employs a message-passing interface (MPI). The computer system includes a processor and memory. The memory has program instructions for compiling a source program. The processor is configured to use the program instructions to detect an MPI application source file, identify a non-blocking communication within the MPI application source file, and overlap independent computation concurrently with the non-blocking communication.

Thus, at least some embodiments of this disclosure are directed to a computer implemented method for processing message passing interface (MPI) calls for a MPI application calling routines from a MPI library, including: identifying blocking MPI-calls, wherein the blocking MPI-calls comprise a MPI-send and a MPI-receive; separating the blocking MPI-calls from non-blocking MPI-calls; splitting the blocking MPI-calls into a new non-blocking MPI-call, wherein the new non-blocking MPI-calls are tagged as an MPI-icall, and wherein the MPI-icall comprises a MPI-isend and a MPI-ireceive, the MPI-icall being different from a MPI-call, and an additional MPI-wait call associated with the new non-blocking MPI-call; collating all the MPI-wait calls, by capturing all the MPI-wait calls; determining a buffer in use by matching the new non-blocking MPI-calls with the MPI-wait calls; checking if the MPI application following the MPI-wait call uses the buffer; sinking the MPI-wait call before the use of the buffer, thereby allowing larger number of instructions to be processed before the MPI-wait call in the buffer; and sinking the MPI-wait call such that it never crosses a defined loop boundary if the MPI-wait call is invoked in a loop.

Also, at least some embodiments of this disclosure are directed to a computer implemented method for processing message passing interface (MPI) calls for a MPI application calling routines from a MPI library, including: identifying blocking MPI-calls, wherein the MPI-calls comprise a MPI-send and a MPI-receive; separating blocking MPI-calls from the non-blocking MPI calls; splitting the blocking MPI-calls into a new non-blocking MPI-call, wherein the new non-blocking MPI-calls are tagged as an MPI-icall, and wherein the MPI-icall comprises a MPI-isend and a MPI-ireceive, the MPI-icall being different from a MPI-call, and an additional MPI-wait call associated with the new non-blocking MPI-call; collating all the MPI-wait calls, by capturing all the MPI-wait calls; determining a buffer in use by matching the new non-blocking MPI-calls with the MPI-wait calls; checking if the MPI application following the MPI-wait call uses a buffer; sinking the MPI-wait call beyond a loop boundary in which the MPI-wait call is originally invoked; and generating a plurality of MPI-wait calls after the loop to compensate for more than one MPI wait call before the use of the buffer.

BRIEF DESCRIPTION OF THE DRAWINGS

Preferred embodiments of the invention are described below with reference to the following accompanying drawings.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Figure 1:
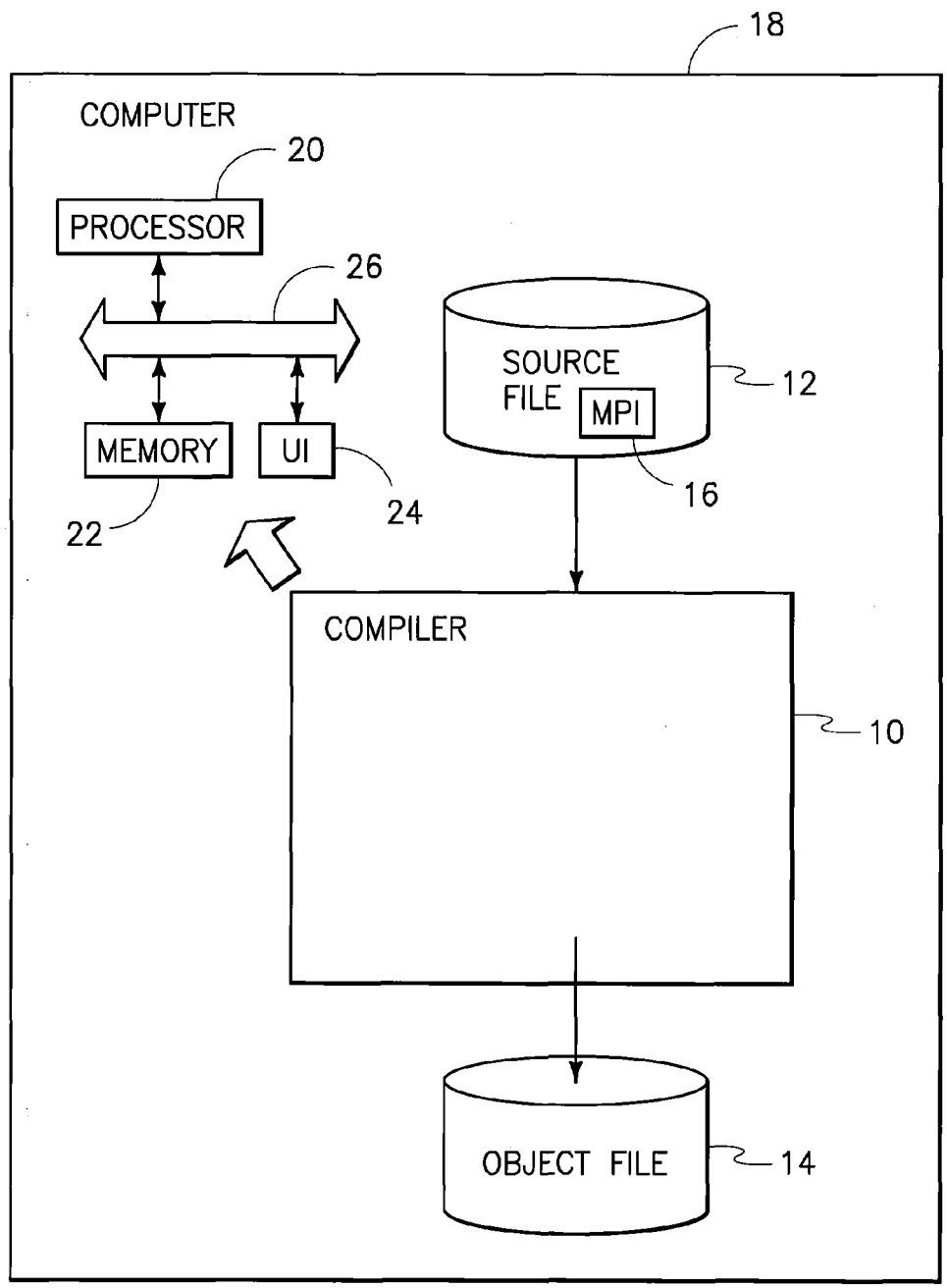

A preferred embodiment of the invention will now be described in more detail, by way of example only, with reference to the accompanying drawings in which:

FIG. 1 is a simplified block diagram illustrating one system configuration for a compiler in which an optimization system and method according to one embodiment of the present invention has been implemented.

FIGS. 2a and 2b illustrate one example of source programs for a "copy_faces" subroutine and an "adi" subroutine.

FIG. 3 illustrates the source program example for the "copy_faces" subroutine of FIG. 2 with MPI wait sinking of the mpi_waits.

FIG. 4 illustrates an example of a source program where an mpi_wait (send_id, . . . ) for an mpi_isend is placed suboptimally.

Figure 5B:
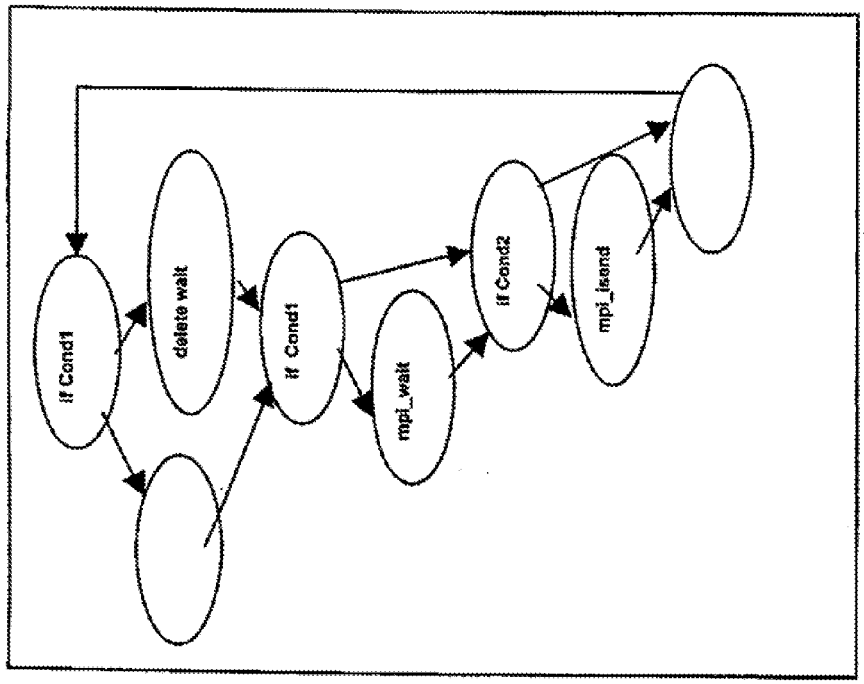

FIGS. 5a and 5b illustrate an example of a source program where mpi_wait has been pushed all the way down to invoking x_send_solve_info, in contrast to the implementation of FIG. 4.

FIG. 6 illustrates an example of a source program implementing a conservative implementation of MPI wait sinking.

FIG. 7 illustrates an example of a source program with a simplified version of the code shown for MG/mg.f which has several mpi_sends nested in conditionals.

FIG. 8 illustrates an example of a source program with a simplified version of the code shown for MG/mg.f where conservative MPI wait sinking has been implemented over the code shown in FIG. 7 and where MPI wait sinking is implemented to nodes which dominate all the use or define points, according to the node diagram of FIG. 7.

FIG. 9 illustrates an example of a source program for an algorithm, usable with a simplified version of the code shown for MG/mg.f, as shown in FIG. 7, where aggressive MPI wait sinking has been implemented over the code shown in FIG. 7, with sinking of mpi_waits to points just before the buffer involved is used or defined, and also sinking waits across the intervals and loops.

Figure 10:
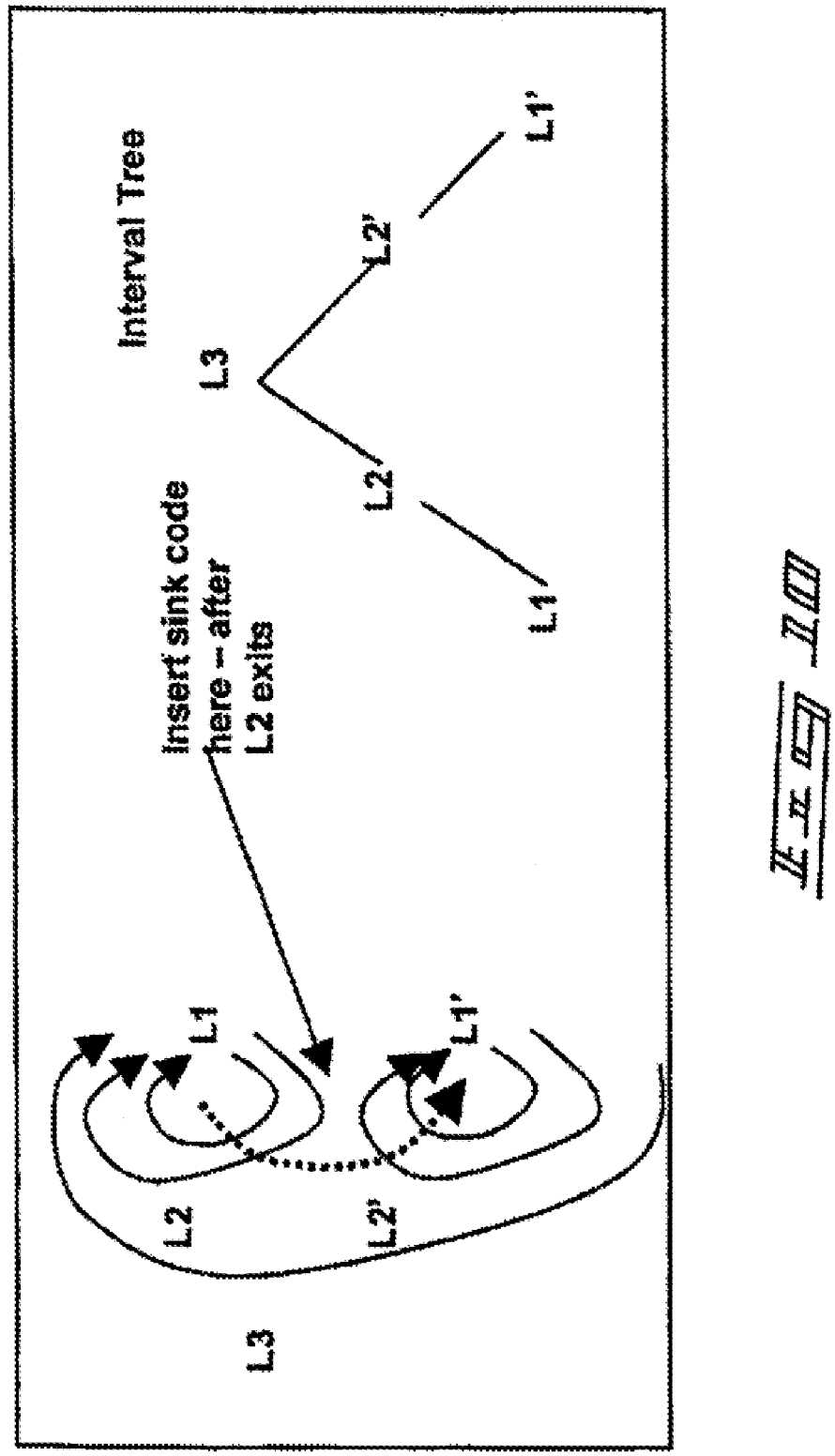

FIG. 10 illustrates an example of a node diagram and an interval tree for the aggressive wait sinking implementation of FIG. 9.

FIG. 11 illustrates an example of a source program with a simplified version of the code shown for MG/mg.f, as shown in FIG. 7, where an inter-interval aggressive wait sinking algorithm is used to arrive at the code.

FIG. 12 illustrates an example of a source program for an algorithm implementing aggressive sink code generation, as shown above with reference to FIG. 11.

FIG. 13 illustrates a process flow diagram for an embodiment of the present invention.

DETAILED DESCRIPTION OF THE PREFERRED EMBODIMENTS

The present invention can be implemented in association with IBM Corporation's XL compiler. This compiler provides a powerful assortment of optimizing transformations available on an array of supported hardware and operating system platforms. However, it is understood that any of a number of different compilers can be used to implement the present invention on any of a number of different computer and/or network systems.

Referring to FIG. 1, a compiler 10 is shown for receiving a source program 12 and generating an object program 14. Compiler 10 is implemented via processing circuitry, or a microprocessor 20 and memory 22 within a computer 18. Communication occurs through a bus interface 26 and input/output is facilitated through one or more user interfaces (UI) 24. Source file 12 includes a library in the form of a message-passing interface (MPI) 16 that is an object of optimization for compiler 10.

A compiler-driven approach is provided for automatically inserting the following for MPI applications: a) Move mpi_wait as far as possible temporally, such that more independent computation can take place; and b) Split blocking mpi_send/mpi_recv to their non-blocking pairs and then move the corresponding mpi_wait as in (a).

Both of these techniques will allow for better CCO and lower run-time of MPI applications. In addition, a programmer can be relieved of the burden of manually hunting for the overlap.

Both conservative as well as aggressive algorithms have been developed for CCO exploitation in order to tackle complicated MPI applications and non-trivial send/recv sequences. This is especially true when these sequences are invoked in loops. The aggressive algorithm is able to introduce groups of mpi_waits at the end of loops for mpi_isends/mpi_irecvs which have not been waited for inside a loop, as part of wait sinking.

The present system and method provides several benefits. First, it helps to reduce the overall running time of a parallel program written in MPI, by overlapping independent computation concurrently with non-blocking communication. This is done by scheduling the synchronization points of non-blocking mpi_isend/mpi_irecv (and its variants), which are invoked using mpi_waits, as late as possible in a temporal sense. This allows independent computation to happen while the communication is in progress. Secondly, it splits blocking send/recv calls to their corresponding non-blocking parts and then applies the first benefit to exploit computation-communication overlap. Thirdly, both conservative as well as aggressive algorithms have been devised for CCO exploitation which can tackle complicated MPI applications and non-trivial send/recv sequences. This is especially true when such sequences are invoked in loops. According to one implementation, this system and method is implemented automatically using a state-of-the-art compiler like the IBM XL compiler.

The present invention has the following advantages: a) It is applicable for MPI applications, whereas previously known techniques do not handle MPI. b) It can handle a much broader class of problems, especially, computation-communication overlap across loops and complicated if-then-else control flow which is not handled by any of the previously known solutions. For this purpose the present algorithm(s) uses the mechanism of code-insertion and run-time checking (see FIGS. 6-9, 11 and 12).

Compiler-driven techniques are provided that will allow better computation-communication overlap. For this to occur, sub-optimally positioned mpi_wait(s) are targeted. These are mpi_wait(s) which can (probably) be moved further ahead (temporally) in the computation resulting in better CCO. This process is termed mpi_wait sinking. Any blocking mpi_send/mpi_recv is also targeted which can be converted to a pair of mpi_isend/mpi_wait (or mpi_irecv/mpi_wait). Subsequently, techniques that are applicable to mpi_wait sinking can be applied to the newly created mpi_wait part of the non-blocking calls.

EXAMPLES

In this section, several cases from the NAS Parallel Benchmarks show mpi_wait sinking for improved CCO. A case from SP/copy_faces.f where MPI_waitall has been used in a suboptimal manner, resulting in a good deal of communication time being wasted in this call. Most of these cases involve mpi_send (or mpi_isend/mpi_wait pair). Additionally, some mpi_recv cases will be addressed below.

Pursuant to a snippet of program code shown in FIG. 2, mpi_waitall is added for all the 12 irecv/isends. This is clearly sub-optimal. The reason for this is the non-usage of out_buffer from the point mpi_waitall is invoked for the 6 isends to the end of the subroutine. A careful inter-procedural examination of SP reveals that copy_faces is called in adi and it is possible to sink the mpi_waits for the mpi_isends all the way after the call to txinvr( ) as the buffer is only overwritten in the *_solve routines. For simplicity during intra-procedural optimizations, it is possible to sink these to the end of the subroutine copy_faces( ).

The next example is also from BT (see FIG. 4) where an mpi_wait(send_id, . . . ) for an mpi_isend is placed suboptimally. The case appears in x/y/z_solve.f in BT. Here, the mpi_wait for an mpi_isend crosses an iteration. That is, the mpi_wait in a particular iteration corresponds to mpi_isend issued in the previous iteration. Such dependences between an mpi_wait and an mpi_isend can be denoted using a loop-back dependence edge. Dependences of this kind have a dependence distance of >=1 over the loop iteration space.

It can be observed that the mpi_wait in question has been placed suboptimally much ahead of the subsequent mpi_isend call in x_send_solve_info which overwrites the in_buffer that mpi_wait waits for. Hence, this mpi_wait can be pushed all the way down to the point before x_send_solve_info is invoked. This has been shown in FIG. 5. Since, the original mpi_wait is embedded in a condition, the condition needs to be carried to the point where the call is inserted. Later it is shown how this can be avoided using certain techniques.

There is another interesting inter-procedural case in MG/mg.f. There exists two functions face3/face3_ex which update a buffer named buff and invoke blocking mpi_send. In another function, two instances of give3/give3_ex are called. They are followed by two instances of take3/take3_ex which read buff. In this scenario, the original mpi_sends in give3/give3_ex can be converted to mpi_isend/mpi_wait pairs and the mpi_wait from the second mpi_isend call in give3 can be sunk below the take3/take3_ex pairs (see FIGS. 7 and 8).

Overview of the Algorithm for mpi_wait Sinking

The algorithm for mpi_wait sinking is divided into three sub-parts.

Figure 5C:
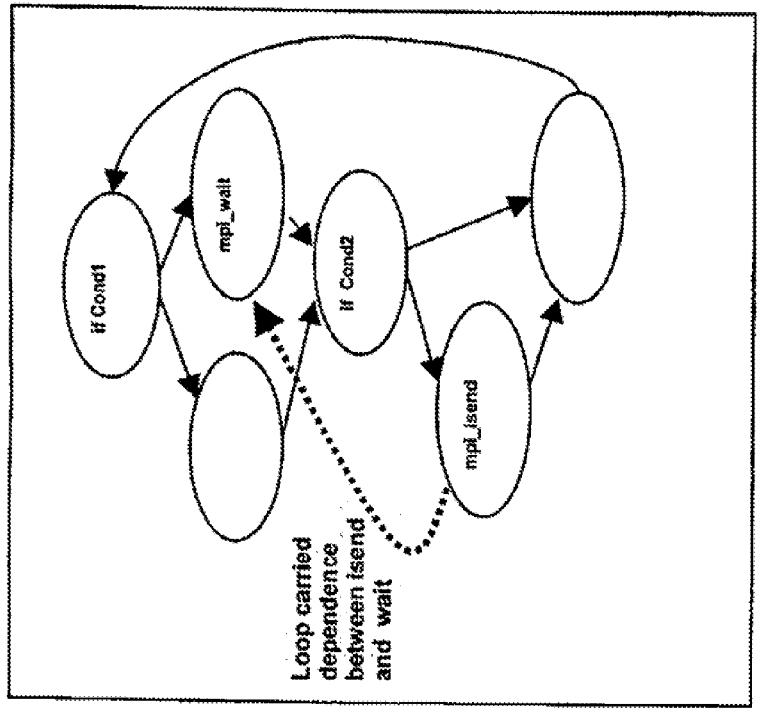

The first part of the algorithm is known as mpi_wait matching. This first part pairs an mpi_wait with an mpi_isend/irecv. In case of mpi_waitall, several mpi_isends/irecvs can pair up with the same mpi_waitall. The mpi_wait matching algorithm works in both the intra-procedural as well as the inter-procedural sense. In FIGS. 4 and 5, the mpi_waits in x_solve pair up with an mpi_isend/irecv embedded in x_send(receive)_solve_info( ) calls. However, in the present implementation things will be made simpler by applying the wait sinking algorithm after inlining has been applied so that information/analyses does not have to be carried inter-procedurally. The matching algorithm finds which buffer is associated with a particular mpi_wait and tracks subsequent usages of this buffer beyond the mpi_wait call (next step).

The second part of the algorithm is the construction of the mpi_wait dependence web. This involves capturing the dependences between the matched mpi-waits and the following (temporally) instructions that use/define the buffer that has been used in the non-blocking isend/irecv.

The final part of the algorithm involves mpi_wait sinking. This moves the mpi_wait call to a suitable position beyond (temporally) its current position, honoring the dependences captured in the previous step.

Conservative Algorithm for MpiWaitSinking

This algorithm works on a per-function basis. All the steps outlined above, matching, dependence computation and sinking are carried out within a single function. To make the method effective, this pass is invoked after the compiler has carried out inlining. This will enable cross-dependences and other complexities to bubble up to a single function level. All cross-interval dependences are satisfied because mpi_waits never move from the original interval where the mpi_sends are invoked. This constraint will be relaxed in a later aggressive algorithm.

The working of the ConservativeMpiWaitSinking(. . .) will be shown by walking through the MG example shown in FIG. 7. The function in question is comm3. For purposes of illustration, it will be assumed that only invocation of ready, give3 and take3 exist in the code. This will be sufficient to elucidate the algorithm outlined above.

The code shown above is from MG/mg.f which has several mpi_sends nested in conditionals. A simplified version of the code has been illustrated here. In this code, it can be observed that the mpi_sends can be split into pairs of mpi_isends and mpi_waits. The mpi_waits can subsequently be moved according to the conservative version of wait-sinking algorithm termed as ConservativeMpiWaitSinking( ). It is to be assumed that 'inlining' of calls like ready/give3/take3 have already taken place before this algorithm is applied. This algorithm corresponds to a 'conservative sinking' approach.

The wait matching phase is trivial because one is, in effect, splitting an mpi_send to mpi_isend/mpi_wait pair, hence the mpi_wait is directly matched to the mpi_isend preceding it. The dependence web building phase constructs dependence edges between the waits([1] and [2]) in nodes 3 and 5 with the writes to buffer involved following it. Each of the mpi wait results in 3 WAR dependence edges to be built, one each for the writes to buffer in nodes 3,8,10 or 5,8,10 shown in broken light edges in the CFG on the right hand side of FIG. 7. A normal SSA use-def will be assumed for constructing these dependence edges. But, the presence of array section analysis may improve the quality of this phase.

To carry out conservative sinking, consider the two mpi_waits in nodes 3 and 5. There is dependence with the wait and buffer updates in nodes 3, 8 and 10. The dependence with node 3 is ignored as it is a loop carried dependence whose distance is greater than 0. Hence DBSet={8,10}. The lca{8, 10} is 7. However, node 7 does not post-dominate 3. Accordingly, one moves up to the immediate dominator of 7, which is node 6. And node 6 does post-dominate 3. So, node 6 is the designated sink-block for the mpi_wait in node 3. For mpi_waits in blocks 8 and 10, the sink block is node 12.

The actual insertion calls mpi_wait(. . .) before node 6 under conditional code. This is carried out by the SinkCodeGenerate( ) function. The SinkCodeGeneration function uses a simple technique for sinking mpi_waits that have been invoked under conditional code. This technique is based on using unique Boolean variables in every path where a mpi_wait is invoked. In each such path, a unique Boolean variable is updated to TRUE every time a mpi_isend/irecv is encountered. Later, before the sink node, the variable is tested for TRUTH and the mpi_wait invoked. After the invocation, the specified variable is set to FALSE. When implemented on the MG code, the final code generated after mpi_wait sinking looks as in FIG. 8.

Aggressive Algorithm for MpiWaitSinking using an Inter-Interval Approach

The aggressive algorithm for mpi_wait sinking sinks mpi_waits to the points just before the buffer involved is used or defined instead of sinking to a node which dominates all the use or define points. This approach also sinks waits across intervals and loops in an aggressive manner.

The crux of the algorithm is to locate all the intervals outside of L where the buffer for which mpi_wait is stalled is being consumed in some way. Once this is carried out, it is necessary to find a suitable node where the wait code of the interval L can be sunk. To find a node that dominates all use/defs in other intervals for the buffer in question, the least common ancestor of all the intervals is extracted where the dependences exist as well as the interval where mpi_wait is invoked. This is the interval where the sink code should be generated. But to find the precise point that will dominate all the use/defs, the ancestor of L in the interval tree is extracted that is a direct child of the interval that is the least common ancestor. The exit node of this ancestor will be the point where the sink code is generated. For the example shown below, if there is a mpi_wait in interval L1 and there is a usage of the buffer in interval L1', denoted by the dotted arrow dependence edge, then the sink code will be generated at the exit point of interval L2. This follows from the algorithm where lca(L1,L1')=L3 and the predecessor of L1 that is a direct child of L3 is L2.

Note that this sinking may involve a bunch of waits rather than a single wait, which has been assumed until now, when handling intra-interval wait sinking. How this is done is explained in the algorithm AggressiveSinkCodeGenerate( ). This function creates an array of resource ids, Rid[ ], equal in length to the loops for each mpi_wait that is encountered in an interval. Two additional variables denoted as w_cnt and i_cnt are associated with each wait. These variables are used to keep track of the next resource id to be used and the resource id already consumed if there are dependences within the same interval (if any).

FIG. 11 employs the inter-interval aggressive wait sinking algorithm to arrive at the code. As there are two mpi_wait points in the loop, the present technique employs two w_cnt, i_cnt and Rid arrays. More particularly, w_cnt keeps track of how many waits have been issued and matched, while i_cnt keeps track of how many isends have been issued. This is done for each matched pair of isend and wait. For every intra-loop dependence that exists, conditional code is employed to generate waits to check whether they are really required at runtime, as shown in FIG. 12. All inter-interval dependences are taken care of by the compensation loops generated at the sink points (as shown in FIG. 11).

FIG. 13 forms a process flow diagram showing the logic processing for optimizing at the time of compiling on a computer a program that employs a message-passing interface (MPI).

As shown in FIG. 13, a logic flow diagram illustrates the steps implemented by this system and method. In Step "S1", an MPI application source file is detected. After performing Step "S1", the process proceeds to Step "S2".

In Step "S2", non-blocking communication within an MPI application source file is identified. Non-blocking communication is located. Blocking communications that are capable of being split into non-blocking and blocking components are identified and split. After performing Step "S2", the process proceeds to Step "S3".

In Step "S3", a computation-communication overlap is determined between the non-blocking communication and an independent computation. After performing Step "S3", the process proceeds to Step "S4".

In Step "S4", independent computation is overlapped concurrently with non-blocking communication. Synchronization points are scheduled and mpi_waits are invoked as late as possible. After performing Step "S4", the process terminates and repeats when necessary.

In summary, the implementation provided above details how mpi_waits can be moved/sunk to the point just before their buffer(s) are utilized. This allows better opportunities to overlap computation with communication. Accordingly, a conservative strategy and an aggressive strategy have been developed to effect this movement. In the first case, the mpi_waits can move only within the interval where they are originally invoked. In the aggressive algorithm, this restriction is loosened by introducing runtime code, thereby allowing mpi_waits originating in one interval to be finally sunk to a totally different interval. The aggressive algorithm can handle a wide class of non-trivial applications that are outside of the scope of the current technology.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A computer implemented method for processing message passing interface (MPI) calls for a MPI application calling routines from a MPI library, the method comprising
   identifying blocking MPI-calls, wherein the blocking MPI-calls comprise a MPI-send and a MPI-receive;
   separating the blocking MPI-calls from non-blocking MPI-calls;
   splitting the blocking MPI-calls into a new non-blocking MPI-call, wherein the new non-blocking MPI-calls are tagged as an MPI-icall, and wherein the MPI-icall comprises a MPI-isend and a MPI-ireceive, the MPI-icall being different from a MPI-call, and an additional MPI-wait call associated with the new non-blocking MPI-call;
   collating all the MPI-wait calls, by capturing all the MPI-wait calls;
   determining a buffer in use by matching the new non-blocking MPI-calls with the MPI-wait calls;
   checking if the MPI application following the MPI-wait call uses the buffer;
   sinking the MPI-wait call before the use of the buffer, thereby allowing larger number of instructions to be processed before the MPI-wait call in the buffer; and
   sinking the MPI-wait call such that it never crosses a defined loop boundary if the MPI-wait call is invoked in a loop.

2. A computer implemented method for processing message passing interface (MPI) calls for a MPI application calling routines from a MPI library, the method comprising
   identifying blocking MPI-calls, wherein the MPI-calls comprise a MPI-send and a MPI-receive;
   separating blocking MPI-calls from the non-blocking MPI calls;
   splitting the blocking MPI-calls into a new non-blocking MPI-call, wherein the new non-blocking MPI-calls are tagged as an MPI-icall, and wherein the MPI-icall comprises a MPI-isend and a MPI-ireceive, the MPI-icall being different from a MPI-call, and an additional MPI-wait call associated with the new non-blocking MPI-call;
   collating all the MPI-wait calls, by capturing all the MPI-wait calls;
   determining a buffer in use by matching the new non-blocking MPI-calls with the MPI-wait calls;
   checking if the MPI application following the MPI-wait call uses a buffer;
   sinking the MPI-wait call beyond a loop boundary in which the MPI-wait call is originally invoked; and
      generating a plurality of MPI-wait calls after the loop to compensate for more than one MPI wait call before the use of the buffer.

* * * * *